United States Patent
Grams et al.

(10) Patent No.: US 7,734,313 B2
(45) Date of Patent: Jun. 8, 2010

(54) WIRELESSLY NETWORKED GAMING SYSTEM HAVING TRUE TARGETING CAPABILITY

(75) Inventors: Richard E. Grams, Chandler, AZ (US);
Ryan M. Brinkerhoff, Mesa, AZ (US);
Manish W. Mahajan, Sunrise, FL (US);
James H. Rinsema, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/216,265

(22) Filed: Aug. 31, 2005

(65) Prior Publication Data
US 2007/0049313 A1 Mar. 1, 2007

(51) Int. Cl.
*H04B 7/00* (2006.01)
*H04Q 7/20* (2006.01)
*H04M 3/42* (2006.01)
*H04B 1/38* (2006.01)
*H04Q 7/22* (2006.01)

(52) U.S. Cl. ............... 455/566; 455/456.1; 455/414.1
(58) Field of Classification Search .............. 455/414.1, 455/456.1, 466, 517, 426.1, 456.3, 41.1, 455/566, 519, 521, 557; 463/40, 39, 41
See application file for complete search history.

(56) References Cited

U.S. PATENT DOCUMENTS

| | | | | |
|---|---|---|---|---|
| 5,618,045 | A * | 4/1997 | Kagan et al. | 463/40 |
| 6,524,189 | B1 * | 2/2003 | Rautila | 463/40 |
| 6,527,641 | B1 * | 3/2003 | Sinclair et al. | 463/39 |
| 6,530,841 | B2 * | 3/2003 | Bull et al. | 463/42 |
| 6,554,707 | B1 * | 4/2003 | Sinclair et al. | 463/39 |
| 6,874,029 | B2 | 3/2005 | Hutcheson et al. | |
| 6,884,172 | B1 | 4/2005 | Lloyd et al. | |
| 6,908,389 | B1 * | 6/2005 | Puskala | 463/40 |
| 7,024,207 | B2 * | 4/2006 | Gorday et al. | 455/456.1 |
| 7,027,836 | B2 * | 4/2006 | Zacks et al. | 455/557 |
| 7,035,653 | B2 | 4/2006 | Simon et al. | |
| 7,058,412 | B2 * | 6/2006 | Lowe et al. | 455/456.3 |

(Continued)

FOREIGN PATENT DOCUMENTS

WO WO 02/42921 A1 5/2002

OTHER PUBLICATIONS

Surveylab, What is ike300?, http://www.surveylab.co.nz/Who_is_ike~qu.html, accessed Nov. 7, 2005, 2 pgs.

(Continued)

*Primary Examiner*—Tilahun B Gesessse

(57) ABSTRACT

A first mobile station (102) can be wirelessly linked to a second mobile station (104). A physical location of the second mobile station with respect to a physical location of the first mobile station can be determined. A first player (112) using the first mobile station can be presented an icon (402) representing a second player using the second mobile station. The icon can be presented from a perspective of an eye level view. At least one targeting icon (410) can be presented to the first player to facilitate targeting of the second player. A physical stimuli can be generated from the first mobile station and/or the second mobile station in response to a simulated weapon activation on the first mobile station. The physical stimuli can be a narrowly focused ultrasound beam (302) modulated to generate an audible sound when a propagation of the ultrasound beam is disrupted by a physical object.

12 Claims, 6 Drawing Sheets

U.S. PATENT DOCUMENTS

| | | | |
|---|---|---|---|
| 7,096,006 B2 * | 8/2006 | Lai et al. | 455/412.1 |
| 2003/0177187 A1 | 9/2003 | Levine et al. | |
| 2004/0002843 A1 | 1/2004 | Robarts et al. | |
| 2004/0128319 A1 | 7/2004 | Davis et al. | |
| 2004/0198403 A1 * | 10/2004 | Pedersen et al. | 455/517 |
| 2004/0229631 A1 | 11/2004 | George | |
| 2005/0049022 A1 | 3/2005 | Mullen | |
| 2006/0223635 A1 * | 10/2006 | Rosenberg | 463/37 |

OTHER PUBLICATIONS

Surveylab, Frequently Asked Questions, http://www.surveylab.co.nz/Detailled_ike_information/FAQs.html, accessed Nov. 7, 2005, 5 pgs.

Geodetic Suppies & Repairs, Garmin Geko GPS, http://www.geodetic.com.au/category879_1.htm, accessed Nov. 7, 2005, 23 pgs.

Tangible Media Group, inTouch, http://tangible.media.mit.edu/projects/intouch, accessed Nov. 7, 2005, 3 pgs.

S. Brave, et al, inTouch: A Medium for Haptic . . . , MIT Media Lab., http://tangible.media.mit.edu/papers/inTouch_CHI97.php, Mar. 22, 1997, 1 pg.

Tangible Media Group, Tangible Bits, http://tangible.media.mit.edu/projects, accessed Nov. 7, 2005, 3 pgs.

A. Chang, et al., Tangible Media Group, ComTouch, http://tangible.media.mit.edu/projects/comtouch, accessed Nov. 7, 2005, 3 pgs.

H. Ishii, et al.,Tangible Media Group, Tangible Bits: Towards Seamless . . . , http://tangible.media.mit.edu/papers/Tangible_Bits_CHI97.php, Mar. 22, 1997, 1 pg.

S. O'Modhrain, Palpable Machines, http://www.medialabeurope.org/research/group.php?id=8, accessed , Nov. 7, 2005, 4 pgs.

I. Oakley, et al., Tilt to Scroll: Evaluating a Motion Based Vibrotactile Mobile Interface, IEEE Computer Society, accessed Nov. 7, 2005, 2 pgs.

S. Hooper, Pacman breaks out of the arcade, http://edition.cnn.com/2004/TECH/11/16/explorers.pacman/, Nov. 16, 2004, 3 pgs.

I. Oakley, Body Mnemonics, http://www.digital.udk-berlin.de/~jussi/projects/body_mnemonics/index.php, accessed Nov. 7, 2005, 3 pgs.

S. Epiphany, Location-based Mobile Phone Games, http://www.smartmobs.com/archive/2004/12/28/locationbased_.html, Dec. 28, 2004, 12 pgs.

M. Whitford, Got Game? GPS-enabled mobile gaming blurs the fantasy/reality line, http://www.gpsworld.com/gpsworld/article/articleDetail.jsp?id=151028, Mar. 1, 2005, 4 pgs.

CNM, CitiTag, http://cnm.open.ac.uk/projects/cititag/, accessed Nov. 7, 2005, 2 pgs.

We-Make-Money-Not-Art, Computer games and Urban perception, http://www.we-make-money-not-art.com/archives/001653.php, Jul. 8, 2004, 6 pgs.

Audio Spotlight, http://www.holosonics.com/, access Nov. 7, 2005, 2 pgs.

Techdirt, Audio Spotlight As A Weapon?, http://www.techdirt.com/articles/20020221/0941225_F.schtml, Feb. 21, 2002, 1 pg.

A. Ward, et. al., The Bat Ultrasonic Location System, AT&T Laboratories Cambridge, http://www.cl.cam.ac.uk/Research/DTG/attarchive/bat/, accessed Nov. 7, 2005, 3 pgs.

Portal - The Guide to Computing Literature - Human pacman: a wide area socio-physical interactive entertainment system in mixed reality. http://portal.acm.org - Year of Publication 2004 - 3 pages.

GameSpot: Colors Hands-On. www.gamespot.com, by Steve Palley, Apr. 6, 2005 - 2 pages.

Telecoms, C5'S Mobile Multiplayer, 3D and Location-Bases Games Conference, Grand Marina Hotel, Barcelona, Spain, Chaired by Dr. Windsor Holden, Senior Analyst, Juniper Research. Apr. 14 and 15th, 2005 www.C5-Online.com - 6 pages.

GameSpot: Colors E3 2005 Updated Hands-On Report. www.gamespot.com, by Carrie Gouskos, May 23, 2005 2 pages.

Patent Cooperation Treaty - International Search Report - Sep. 25, 2007 - 10 pages.

Patent Cooperation Treaty - International Preliminary Report on Patentability under Chapter I of the PCT dated Mar. 13, 2008 - 8 pages.

* cited by examiner

WIRELESSLY NETWORKED GAMING SYSTEM HAVING TRUE TARGETING CAPABILITY

BACKGROUND OF THE INVENTION

1. Field of the Invention

The present invention generally relates to gaming devices and, more particularly, to mobile gaming devices communicatively linked via wireless communications network.

2. Background of the Invention

A wide variety of gaming devices are currently available, and their use has become pervasive among youths and young adults. Examples of these gaming devices include handheld gaming units, gaming consoles, and virtual reality gaming systems. Virtual reality gaming systems typically require a user to wear a head mounted display and manipulate tactile input devices. The tactile input devices generally are connected via cables to computer hardware, thus limiting the range of movement available to the user.

Recently, gaming systems have been designed which utilize mobile communication devices, such as wireless telephones or personal digital assistants (PDAs). Such gaming systems enable a user to move through a physical environment without being encumbered by cables. However, these systems lack realism often sought by game players.

SUMMARY OF THE INVENTION

The present invention relates to a gaming system that includes at least a first mobile station. The first mobile station can include a wireless adapter which communicatively links the first mobile station to at least a second mobile station. For example, the first mobile station and the second mobile station can be communicatively linked via a wireless local area network (WLAN), a cellular communications network, and/or through direct wireless communications.

The first mobile station and the second mobile station each can be communicatively linked to a positioning system that determines the physical location of the second mobile station with respect to the physical location of the first mobile station. The positioning system can be, for instance, a global positioning system (GPS) or a local positioning system.

The first mobile station also can include a targeting display which presents to a first player using the first mobile station an icon representing a second player using the second mobile station. The icon can be represented from a perspective of an eye level view. In addition, at least one targeting icon can be presented on the display. The targeting icon can be used by the first player to target the second player based on the physical location of the second station with respect to the first station.

The first mobile station and the second mobile station each can include a sensory output device which is responsive to a simulated weapon activation on the first mobile station. The sensory output device can generate a physical stimuli when the simulated weapon activation occurs while the targeting icon is at least partially aligned with the icon representing the second player. An intensity of the physical stimuli can correlate to a degree of alignment of the targeting icon and the icon representing the second player. The intensity of the physical stimuli also can correlate to a type of weapon being simulated.

In one arrangement, the sensory output device can include an ultrasound transducer which generates at least one narrowly focused ultrasound beam. The ultrasound transducer can modulate the ultrasound beam to generate an audible sound when a propagation of the ultrasound beam is disrupted by a physical object. The audible sound can, for example, communicate a user selectable message. The frequency and/or intensity of the ultrasound beam can be selectively controlled based on the determined physical location of the second mobile station with respect to an aiming of the first mobile station and/or a location of the first mobile station.

The present invention also relates to a method of supporting interactive gaming among a plurality of mobile stations. The method can include receiving location information identifying a location of a second mobile station, and transmitting the location information to a first mobile station. Further, a hit or miss identifier can be received from the first mobile station in response to a simulated weapon activation on the first mobile station. The hit or miss identifier can be selected at least in part based on the transmitted location information. The hit or miss identifier can be transmitted to the second mobile station.

A level of physical stimuli can be selected at least in part based on the location information. Physical stimuli information correlating to the selected level of physical stimuli can be transmitted to the second mobile station. The selection of the level of physical stimuli can be in response to the simulated weapon activation occurring while a targeting icon on a display of the first mobile station is at least partially aligned with an icon representing at least a second player associated with the second mobile station.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

The present invention relates to a method and a system for implementing a location based game which maps onto a mobile station a physical location and orientation of game players in a virtual three-dimensional environment. The station can include a targeting display that presents icons representing other players from the perspective of an eye level view of a first player. In addition, the targeting display can present a targeting icon which the first player can use to target other players based on the physical locations of the respective players.

The station also can include a sensory output device that is responsive to simulated weapon activation on the station or on another station. For example, the station can include an ultrasound transducer that generates a narrowly focused ultrasound beam which, when disrupted by a physical object in its propagation path, generates audible sounds to communicate a user selectable message. Accordingly, another player who is struck by the ultrasound beam will receive instant feedback when he has been successfully targeted with the simulated weapon activation.

Figure 1:
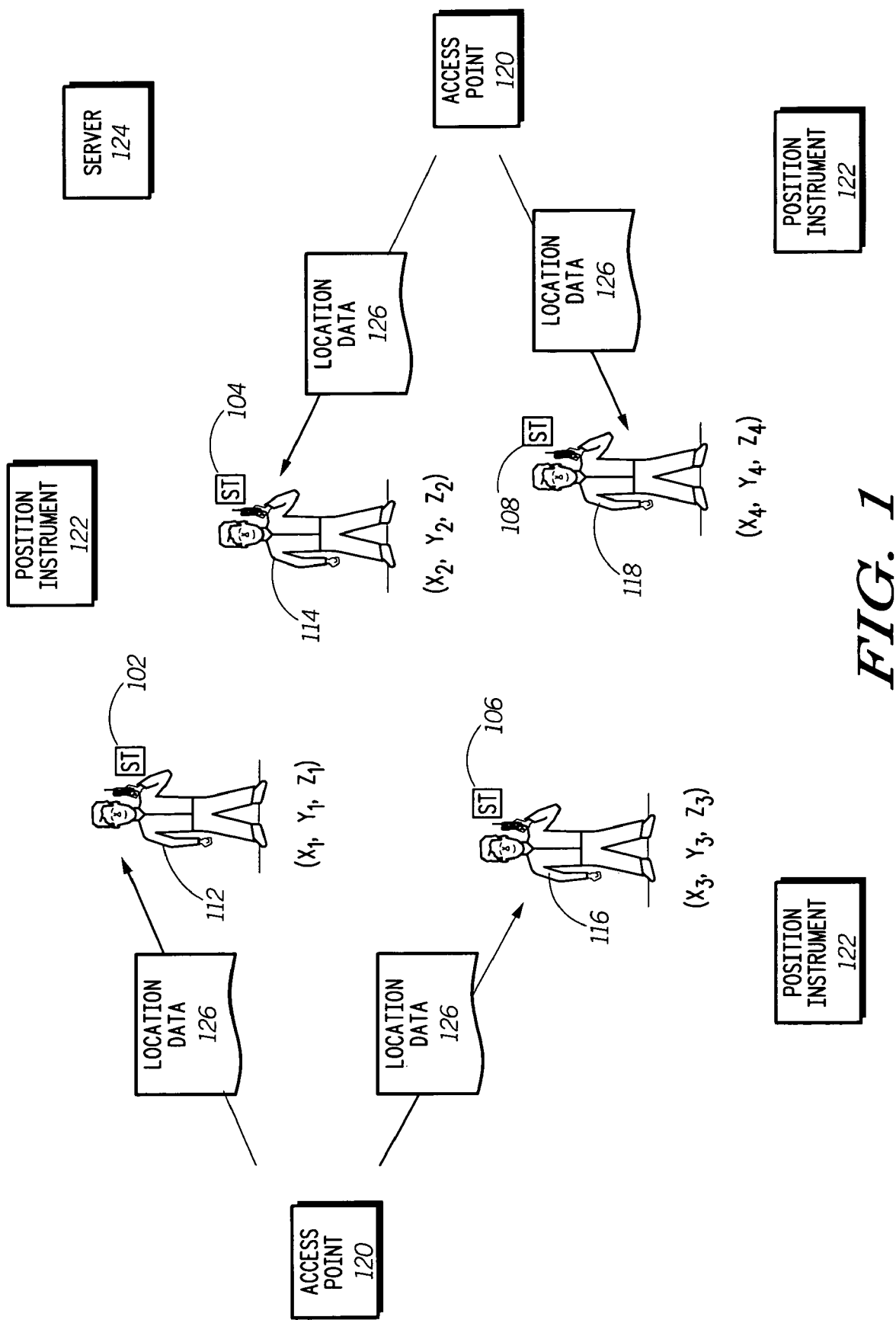
FIG. 1 is a diagram of a gaming system which is useful for understanding the present invention.

Referring to FIG. 1, a diagram is presented of a gaming system 100 which is useful for understanding the present invention. The gaming system 100 can include a plurality of mobile stations (hereinafter "stations") 102, 104, 106, 108, each of which can be associated with a respective game player 112, 114, 116, 118. The stations 102, 104, 106, 108 can be mobile gaming devices, mobile telephones, personal digital assistants (PDAs), tablet personal computers, or any other mobile communication devices suitable for use by game players to target other players based on their respective physical locations.

Access points 120 can be provided in the gaming system 100. The access points 120 can be any wireless access points compatible with the communications protocol that the stations 102, 104, 106, 108 use to communicate. For instance, if the stations 102, 104, 106, 108 communicate in accordance with the IEEE 802.11 protocol, the access points 120 can be IEEE 802.11 access points. If the stations 102, 104, 106, 108 communicate via a mobile telecommunications protocol, for example the global system for mobile communications (GSM) protocol, time division multiple access (TDMA), code division multiple access (CDMA) or DoCoMo, the access points 120 can be cellular communications towers. Still, the invention is not limited in this regard. Indeed, if the stations 102, 104, 106, 108 support direct wireless communications among each other, the system 100 can be implemented without the access points 120.

Position instruments 122 can be used to determine the physical locations of the respective players 112, 114, 116, 118. For example, in one arrangement, the position instruments 122 can be global positioning satellites, and the stations 102, 104, 106, 108 each can include a global positioning system (GPS). Each GPS can receive signals from the respective global positioning satellites to implement trilateration. For example, two-dimensional trilateration can be used to provide longitude and latitude coordinates for the respective stations 102, 104, 106, 108, and three-dimensional trilateration can be used to provide altitude coordinates for the respective stations 102, 104, 106, 108 in addition to longitude and latitude. Measured values for altitude, longitude and latitude can be averaged to compensate for potential GPS inaccuracies and present fluid player movement.

In another arrangement, the position instruments 122 can be land based components which generate signals that can be used by the stations 102, 104, 106, 108 to implement trilateration in order to determine their respective locations within a defined region. In this arrangement, the position instruments 122 can be located within a building, a park, a city, or any other geographically defined region. If network access points 120 are used in the system 100, the position instruments 122 can be incorporated as components of the network access points 120.

In yet another arrangement, the stations 102, 104, 106, 108 can transmit signals detectable by the position instruments 122 to determine the respective station locations. For example, each station 102, 104, 106, 108 can transmit a positioning signal at a frequency and/or in a respective time slot that is allocated to the respective station 102, 104, 106, 108. The signal can be in the radio frequency (RF) spectrum, ultraviolet (UV) spectrum, infrared (IR) spectrum, or any other suitable frequency spectrum. The plurality of position instruments 122 can detect the positioning signal of each station 102, 104, 106, 108 and generate timing information correlating to the respective positioning signals. The timing information can be forwarded to a server 124 and processed to determine the respective locations using trilateration. Again, if network access points 120 are used in the system 100, the position instruments 122 can be incorporated as components of the network access points 120. Moreover, in lieu of positioning signals, communication signals otherwise generated by the stations 102, 104, 106, 108 can be processed to generate the timing information that is used to determine the respective locations of the stations 102, 104, 106, 108.

Regardless of the manner in which the respective locations of the stations 102, 104, 106, 108 is determined, location data 126 can be shared among the stations 102, 104, 106, 108. For instance, if three-dimensional location information is being generated, the latitude, longitude and altitude data (X, Y, Z) for the locations of the respective stations 104, 106, 108 can be transmitted to station 102. Similarly, the latitude, longitude and altitude data of the respective stations 102, 106, 108 can be transmitted to station 104, and so on. The location data 126 can include an identifier for each set of location data.

In an arrangement in which the server 124 is used to generate the location data in lieu of each station determining its own location, the location data 126 can include the location data for all of the stations 102, 104, 106, 108. In this arrangement the location data can be transmitted to all stations 102, 104, 106, 108 simultaneously with a common signal. The identifiers for each set of location data can be processed by the individual stations 102, 104, 106, 108 to determine which location data correlates to which station 102, 104, 106, 108.

If the system 100 includes access points 120, the access points 120 can be used to transmit the opponent location data 126 to the respective stations 102, 104, 106, 108. If, however, the stations support direct wireless communications among each other, each station 102, 104, 106, 108 can transmit its own location data to the other stations 102, 104, 106, 108.

Each of the stations 102, 104, 106, 108 can process the location data 126 for gaming purposes. For instance, station 102 can process the location data 126 and use this data to determine where on a display to place icons representing the stations 104, 106, 108. Moreover, the location data 126 can be processed for targeting purposes and to determine whether one or more of the players 112, 114, 116, 118 have been hit with a simulated weapon activation. For instance, the station 102 can compare the location of the stations 104, 106, 108 to the direction and elevation where the station 102 is pointing when a simulated weapon activation is initiated by a player using the station 102, and declare a direct hit upon a station 104 that is located where the station 102 is pointing.

In a case in which a weapon being simulated travels in a non-linear path, for example if the weapon is a grenade launcher, the distance between the stations 104, 106, 108 and the station 102 can be considered to determine whether a direct hit is declared. The target distance of the simulated grenade launcher can be determined by the inclination of the station 102 and/or user selectable settings on the station 102.

If a direct hit occurs, the station 102 can communicate such an occurrence to the stations 104, 106, 108 that are hit, all of the other stations 104, 106, 108 and/or the server 124. If the location of one or more of the stations 104, 106, 108 is near the direction the station 102 is aiming, but not directly on target, the station 102 can declare a near miss, and again communicate this information to the other stations 104, 106, 108 and/or the server 124. In the case of a near miss, a damage level can be communicated with the near miss communication. The damage level can be determined by the degree of alignment, or proximity, of a station 104 to the direction and elevation where the station 102 is aiming, and the type of weapon being simulated. For example, if the station 104 is located three feet off target from a direction where the station 102 is aiming when a simulated rifle activation occurs on the station 102, the station 104 may not be considered to receive a near miss. Such a station 104 may be considered to receive a near miss, however, if the simulated weapon is a shotgun.

Figure 2:
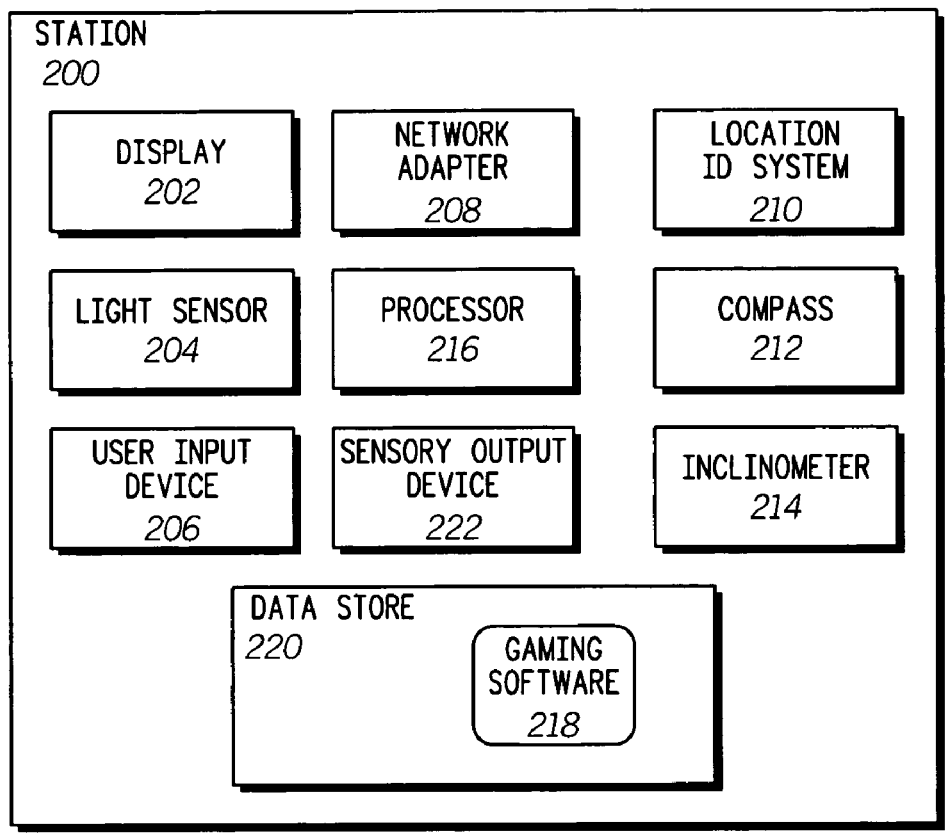
FIG. 2 is a block diagram of a station which is useful for understanding the present invention.

FIG. 2 is a block diagram of a station 200 which is useful for understanding the present invention. The station 200 can include a targeting display (hereinafter "display") 202 for presenting a graphical user interface (GUI). The display 202 can be a liquid crystal display (LCD), a liquid crystal on silicon (LCOS) display, a plasma display, a cathode ray tube (CRT), or any other display suitable for use on a mobile station. The display 202 can be black and white or color.

In one arrangement, a plurality of display settings can be provided to optimize the display 202 for the environment in which the station 200 will be used. For example, if the station 200 is to be used outdoors, the luminosity, contrast, hue and/or any other parameters of the display 202 can be automatically adjusted so that the display 202 will be clearly visible in sunlight. When the station 200 is used indoors, the parameters of the display 202 can be automatically adjusted to optimize the display 202 for indoor use. The adjustment of the display parameters can be responsive to a light sensor 204, or a user input received via a user input device 206. The user input device 206 can include a keypad, a touch pad, buttons, switches, sensors, and/or any other devices which can be used to receive user inputs.

The station 200 also can include a wireless network adapter 208 for transmitting and receiving data from the access points, or from other stations. The wireless network adapter can support IEEE 802 wireless communications, WPA, WPA2, GSM, TDMA, CDMA, DoCoMo, direct wireless communication, or any other communications protocol implemented in the communications network. In an arrangement in which the station 200 supports multiple communication modes, the wireless network adapter 208 may support multiple communications protocols. In another arrangement, one or more additional network adapters (not shown) can be provided with the station 200. Accordingly, the station 200 can be used in multiple types of communication networks.

A location identification system 210 also can be provided with the station 200. The location identification system 210 can be, for example, a GPS. In another arrangement, the location identification system 210 can be a signal generator which generates a signal that can be processed to determine the physical location of the station 200. Implementation of the GPS and the signal generator has been previously described herein. In one arrangement, the location identification system 210 can include both a GPS and a signal generator.

The station 200 also can include a direction/orientation identification system. The direction/orientation identification system can include a compass 212 and an inclinometer 214. The compass 212 can be used to determine a direction in which the station 200 is oriented. For example, the compass 212 can identify a direction with reference to the display 202. In particular, the compass 212 can identify the direction that is perpendicular to, and extending away from, a back of the display screen. In another arrangement the compass 212 can identify the direction that is perpendicular to a selected portion of the station chassis. Nonetheless, the invention is not limited in this regard and one or more other direction references can be used.

The inclinometer 214 can be used to determine an inclination of station 200. The inclinometer 214 can be a digital tilt sensor, such as an accelerometer ASIC, a micro electromechanical system (MEMS) device, or any other device suitable for sensing inclination. The inclinometer 214 can be configured to measure the inclination of the station 200 with respect to the display 214, the station chassis, or another reference point.

A processor 216 can be provided for processing gaming software 218, as well as performing other processing functions. The processor 216 can include a central processing unit (CPU), a digital signal processor (DSP), an application specific integrated circuit (ASIC), a programmable logic device (LPG), and/or any other suitable processing device. The processor 216 can be communicatively connected to any of the station components to receive, process and generate data in accordance with the requirements of gaming software 218. For instance, the processor can receive location data from the location identification system 210, receive direction data from the compass 212, receive inclination data from the inclinometer 214, and process such data to generate a GUI that is presented on the display 202.

The gaming software 218 can be retrievable from a data store 220, which can include one or more data storage devices. A data storage device can be, for example, a magnetic storage medium, such as a hard disk drive (HDD), an optical storage medium, such as a digital video disk (DVD), an electronic storage medium, such as random access memory (RAM), a magneto/optical storage medium, or any other suitable storage device. Moreover, the data store 220 can include any combination of storage devices.

The station 200 also can include a sensory output device 222 which generates a physical or audible sensation to the user of the station 200 and/or a user of another station. The sensory output device 222 can be, for example, a sensory output device which is responsive to a simulated weapon activation on the station, or a simulated weapon activation by another user targeting the station. For example, the sensory output device 222 can include a vibration generator that vibrates the station 200 when the player using the station 200 is successfully targeted by a simulated weapon activation by a user of a second station, for instance in response to receiving a hit message. The amount of vibration that is generated can correlate to the degree of alignment of the location of the station 200 to the aim of the second station, the distance of the station 200 to the second station, and/or the type of weapon being simulated. For instance, a greater amount of vibration can be applied if the weapon being simulated by the second station is a grenade launcher as opposed to the amount of vibration applied if the weapon being simulated is a rifle.

Figure 3:
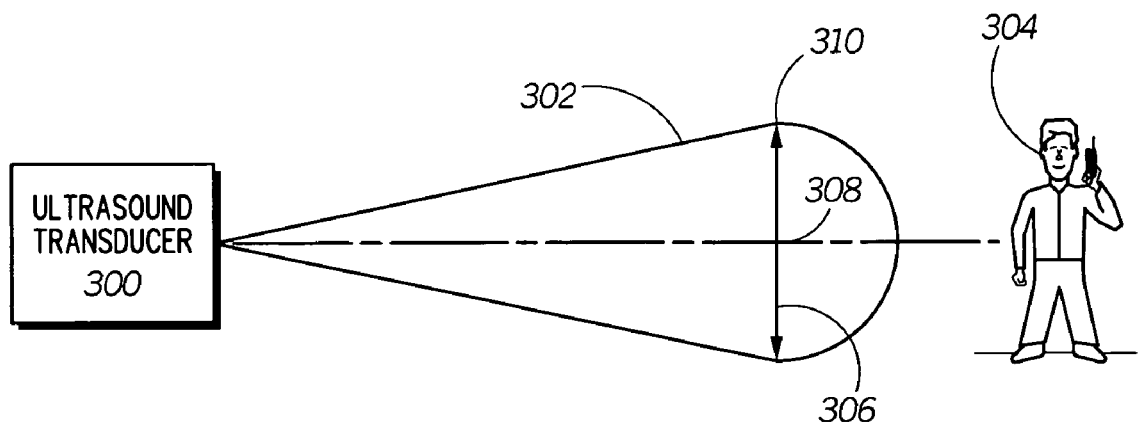
FIG. 3 is a diagram which depicts an ultrasonic transducer which is useful for understanding the present invention.

In another arrangement, the sensory output device 222 can include ultrasound transducer 300, which is depicted in FIG. 3. The ultrasound transducer 300 can be an electrostatic sound transducer, a ribbon sound transducer, a moving motor sound transducer having a low inductance voice coil immersed in a magnetic field, or any other sound transducer suitable for generating ultrasound signals. The ultrasound transducer 300 can generate a narrowly focused ultrasound beam 302 which can be felt by a player 304 who is in the path of the ultrasound beam, thus providing a haptic hit experience.

The ultrasound beam 302 also can be used as a carrier wave and modulated with a signal in the audible frequency spectrum, thus creating a hybrid wave. The modulation scheme can be implemented so that when the ultrasound beam 302 is disrupted by a physical object in its propagation path, for example by the player 304, it generates an audible sound. For instance, the audible sound can be the sound of an explosion or a user programmable message, such as "Moby got you." Accordingly, when the player 304 is struck by the ultrasound beam 302, he may receive instant feedback that he has been successfully targeted with the simulated weapon activation.

The dispersion of the ultrasound beam 302 is a function of the wavelength of the signal as measured with respect to the diameter or width of the ultrasound transducer 300. Accordingly, the frequency of the ultrasound beam 302 can be user selectable to control the lobe characteristics of the ultrasound beam 302. In particular, a relatively short wavelength can be used to produce the ultrasound beam 302 to have a narrow width 306, while a relatively long wavelength can be used to generate the ultrasound beam 302 to have a broader width 306. Thus, the ultrasound beam 302 can be adjusted to a higher frequency to narrow the width 306 of the ultrasound beam 302, or adjusted to a lower frequency to broaden the width 306 of the ultrasound beam 302. In this manner, the width 306 of the ultrasound beam 302 can be adjusted in accordance with the type of weapon being simulated, for example a shotgun or a rifle.

The frequency, and thus width 306, of the ultrasound beam 302 also can be selectively controlled based on a distance of the player 304 from the ultrasound transducer 300. For example, if the player 304 is far away from the ultrasound transducer 300, it can be advantageous to narrow the width 306 of the ultrasound beam 302 to direct a greater amount of acoustic energy at the player 304. This can compensate for acoustic energy that is dissipated as the ultrasound beam 302 travels through a propagation medium, such as air. In addition, the intensity of the ultrasound beam 302 also can be selectively controlled to compensate for acoustic energy that is dissipated. In one arrangement, the frequency and/or intensity of the ultrasound beam 302 can be automatically determined by the processor based on the location parameters.

Moreover, the width 306 of the ultrasound beam 302 also can be adjusted based on the skill level of the players. For example, the width 306 of the ultrasound beam 302 can be adjusted to be wide to make the targeting of other players 304 relatively easy for those players having lower skill levels. On the other hand, the width 306 of the ultrasound beam 302 can be adjusted to be narrow to make targeting of other players 304 relatively harder for those players having higher skill levels.

The lobe characteristics of the ultrasound beam 302 also are advantageous for indicating targeting accuracy. For example, the amplitude of a portion of the ultrasonic beam striking the player 304 can be relatively high if the player 304 is struck with a center portion 308 of the ultrasonic beam, while the amplitude of the portion of the ultrasonic beam striking the player 304 can be relatively lower if the player 304 is struck only with a side portion 310 of the ultrasonic beam. Thus, the intensity of the ultrasonic beam 302 as perceived by the player 304 can correlate to a degree of alignment of the aim of the station generating the ultrasonic beam with the player 304.

Figure 4:
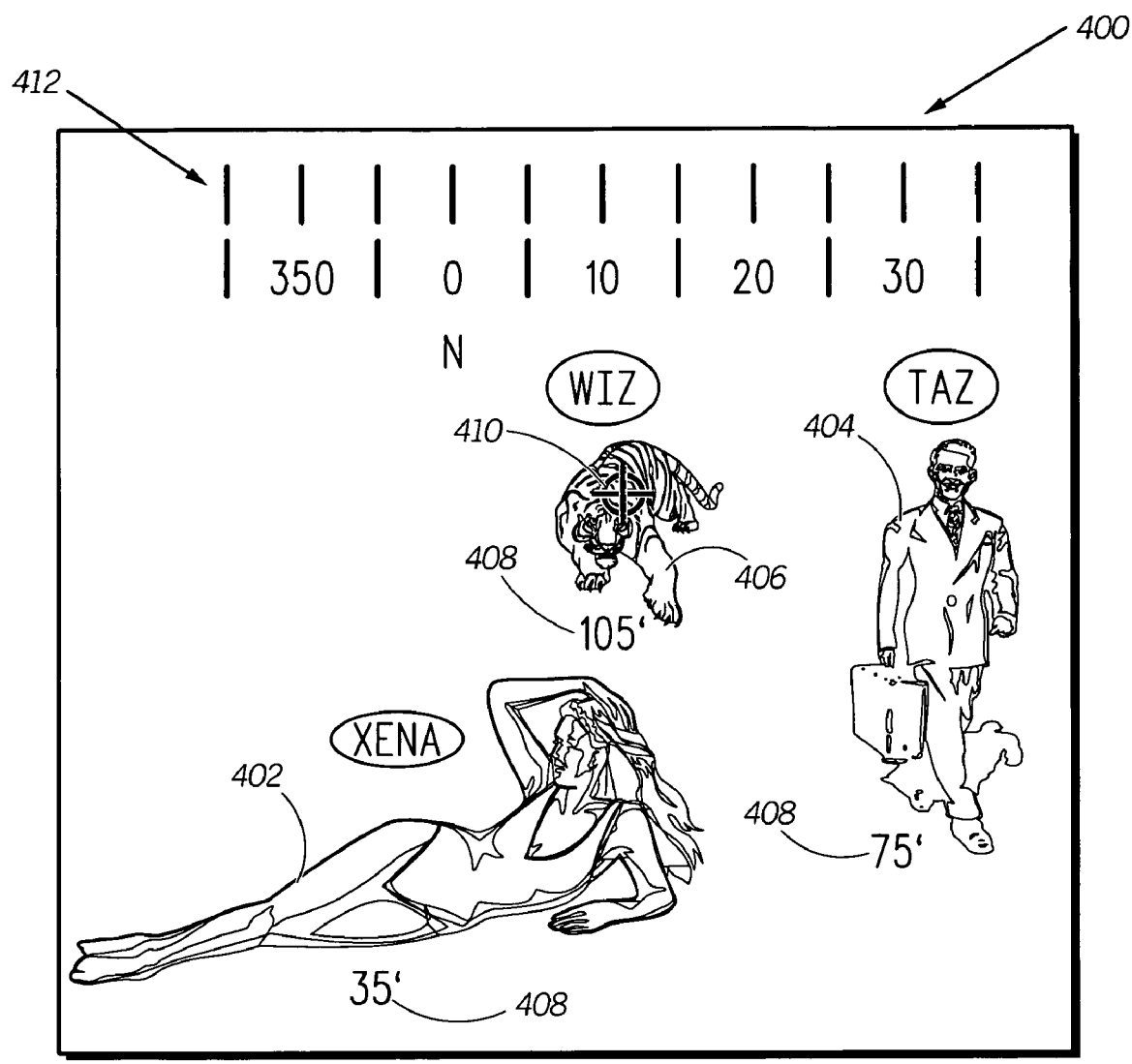
FIG. 4 depicts a graphical user interface which is useful for understanding the present invention.

An example of a GUI 400 that can be presented on the display 202 is shown in FIG. 4. The GUI 400 can be a three-dimensional view that includes user selectable icons 402, 404, 406 which represent other players in the game. In one arrangement, each player can choose his own icon to represent him in the game. Each player's particular station can forward his selected icon, or an identifier correlating to the selected icon, to other players in the game. In another arrangement, a first player can assign icons to represent other players on the first player's station.

The icons 402, 404, 406 can be positioned in the GUI 400 to represent the locations of other players in the game. For instance, if Xena is located closest to the station and to the left of where the station is pointing, Xena can be represented in the GUI 400 by an icon 402 positioned in a lower left portion of the display. If Taz is located farther away from Xena and to the right of where the station is pointing, Taz can be represented by an icon 404 that is positioned in the GUI 400 above Xena and to the right of center.

Because Taz is farther away from the station than Xena, the icon 404 can be smaller than the icon 402 to indicate the difference in distances. Similarly, the icon 406 representing Wiz can be smaller yet, indicating that Wiz is farther from the station than both Xena and Taz. Further, distance indicators 408 can be provided in GUI 400. For example, a distance indicator 408 can be presented beneath each of the icons 402, 404, 406 to represent the respective distances from the station of the players to whom the icons 402, 404, 406 correlate. The size and positions of the icons 402, 404, 406 in the GUI 400 can be updated in real time as the stations with which the icons 402, 404, 406 are associated move.

An indicator (not shown) can be presented with the icons 402, 404, 406 of those players who are in a position to target the first player who is using the station on which the GUI 400 is presented. In another arrangement, the icons 402, 404, 406 which are presented can be limited to those players who are in a position to target the first player. Further, either of these arrangements can be user selectable options.

Altitude coordinates also can be presented in the GUI 400 to indicate the altitude of the respective players. For example, an altitude indicator (not shown) can be associated with each icon 402, 404, 406. The altitude coordinate can be an absolute altitude, for instance with respect to sea level, or a relative altitude, for example with respect to the station on which the GUI 400 is presented. Further, the GUI 400 also can present directional coordinates 412 to indicate a direction that the station is pointing and the direction of the various players with respect to the station. The directional coordinates can represent a compass heading, or any other suitable direction indicator.

A targeting icon 410 can be presented in the GUI 400 to indicate where the station is pointing. In one arrangement, a visual indicator can be provided when the station is pointing directly at another player. For example, the targeting icon 410 can change color when the station is pointed at another player. In one arrangement, the color to which the targeting icon 410 changes can depend on whether the other player is on an opposing team. For example, the targeting icon 410 can turn red when the station is aimed at an opposing player, and blue when the targeting icon is aimed at a teammate. Still, the invention is not limited in this regard and any other suitable visual indicator can be used.

The intensity of physical stimuli generated by the sensory output device, for instance the intensity of an ultrasound beam or intensity of device vibration, can correlate to the degree of alignment of the targeting icon 410 with one or more of the icons 402, 404, 406 representing the other players. For example, the level of physical stimuli generated can be relatively greater when the targeting icon 410 is precisely aligned with one of the icons 402, 404, 406 when a simulated weapon activation occurs, as opposed to the level of physical stimuli generated while the targeting icon 410 is only partially aligned with one of the icons 402, 404, 406. In one arrangement, the intensity of the physical stimuli can be automatically selected by the processor or the server based on aiming accuracy.

In one aspect of the invention, a player can share a view of his GUI 400 with one or more other players. For instance, a player can share the view of his GUI 400 with other players on his team. Password, keys and/or identifiers generated by teammates' stations can be used to authenticate the stations.

Once a station is authenticated, for example by a server or the station sharing the view of the GUI 400, the view data can be transmitted to the authenticated station.

Figure 5:
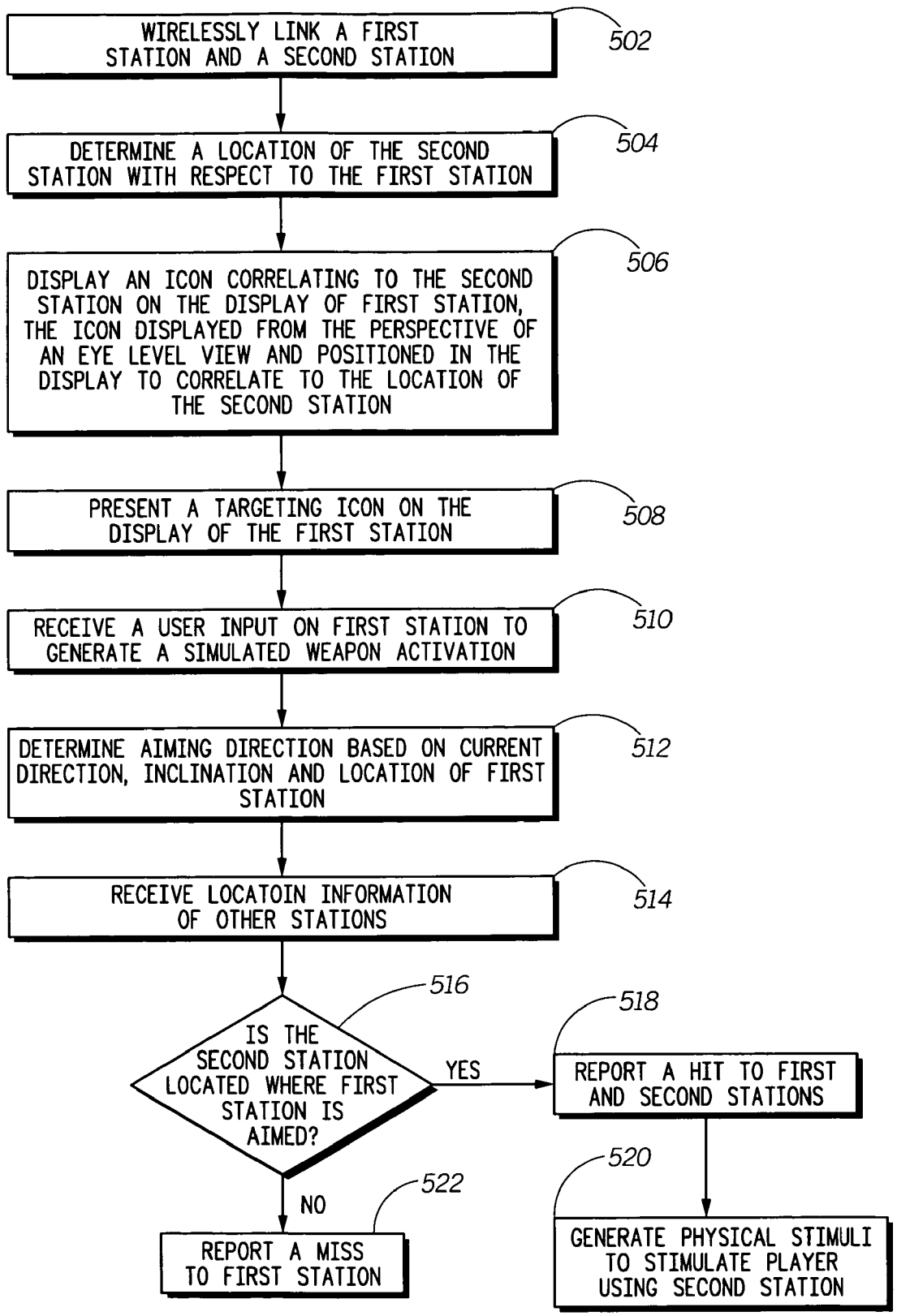
FIG. 5 is a flow chart which is useful for understanding the present invention.

FIG. 5 is a flow chart that presents a gaming method 500 which is useful for understanding the present invention. Beginning at step 502, a first station and at least a second station can be wirelessly linked together. For instance, the stations can be linked via a communications network having access points, or linked via direct wireless communications. At step 504, a location of the second station with respect to the first station can be determined. Continuing to step 506, an icon correlating to the second station can be presented on the display of the first station. The icon can be displayed from the perspective of an eye level view, and positioned in the display to correlate to the location of the second station.

A targeting icon also can be presented on the display of the first station, as shown in step 508. The targeting icon can indicate where the first station is aimed. A presentation of the targeting icon over the icon correlating to the second station can indicate that the first station is aimed at the second station.

At step 510, a user input can be received on the first station to generate simulated weapon activation. For instance, if the player using the first station has selected a rifle as a weapon, the player input can activate a simulated firing of a rifle. At step 512, the aiming direction of the first station can be determined. The aiming direction can be based on the current direction the first station is pointing, the inclination of the first station, and the location of the first station. Referring to step 514, location information can be received for other stations, such as the second station.

Proceeding to decision box 516, if the second station is located where the first station is aimed, a hit can be reported to the first and second stations, as shown in step 518. For example, the first station can transmit a "hit" indicator to the second station. Both the first and second stations can display a message on their respective displays to indicate to players that the player using the second station has been hit. In another arrangement, a server can process the location and aiming information to determine whether the second station has been successfully targeted. In this arrangement, the server can transmit the "hit" indicator to the first and second stations, and again the stations can display "hit" messages on their respective displays. At step 520, a physical stimulus can be generated to stimulate the player using the second station. For instance, the second station can vibrate, or the second player can receive an ultrasonic pulse generated by the first station.

Referring to step 522, if there are no stations located where the first station is aimed, a miss can be reported to the first station. For example, if the first station is processing direction and location data to determine whether there is a hit or miss, the first station can display a "miss" message on the display of the first station. If the server determines whether there is a hit or miss, it can transmit the "miss" indicator to the first station.

Figure 6:
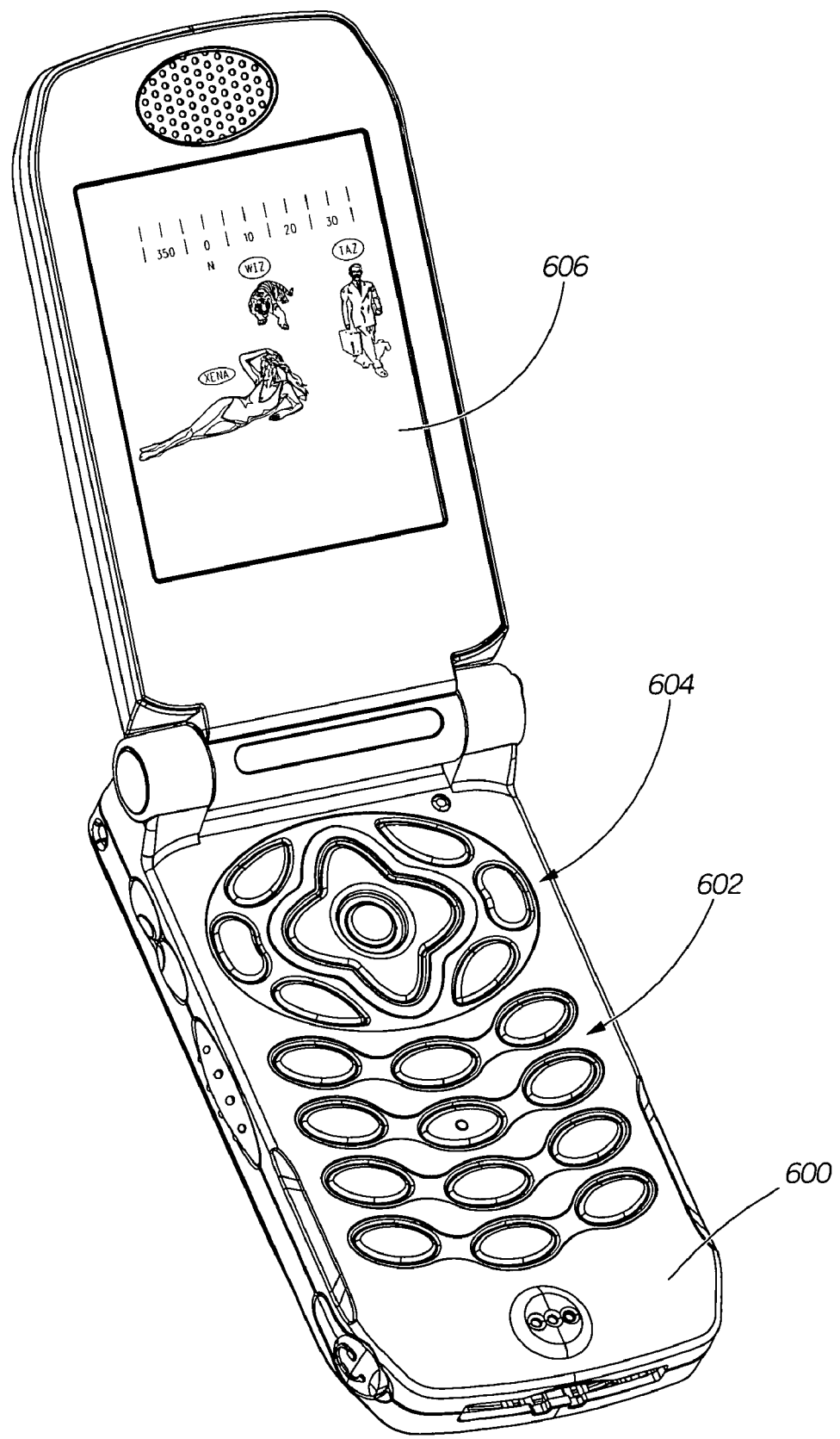
FIG. 6 depicts an embodiment of the station of FIG. 2 which is useful for understanding the present invention.

FIG. 6 depicts an embodiment of the station in which the station is implemented as a mobile telephone 600. In this embodiment, a telephone keypad 602 and navigation controls 604 can be used to receive user inputs. For instance, the keypad 602 can be used to select a type of weapon to simulate. A telephone display 606 can be used to present the GUI.

Figure 7:
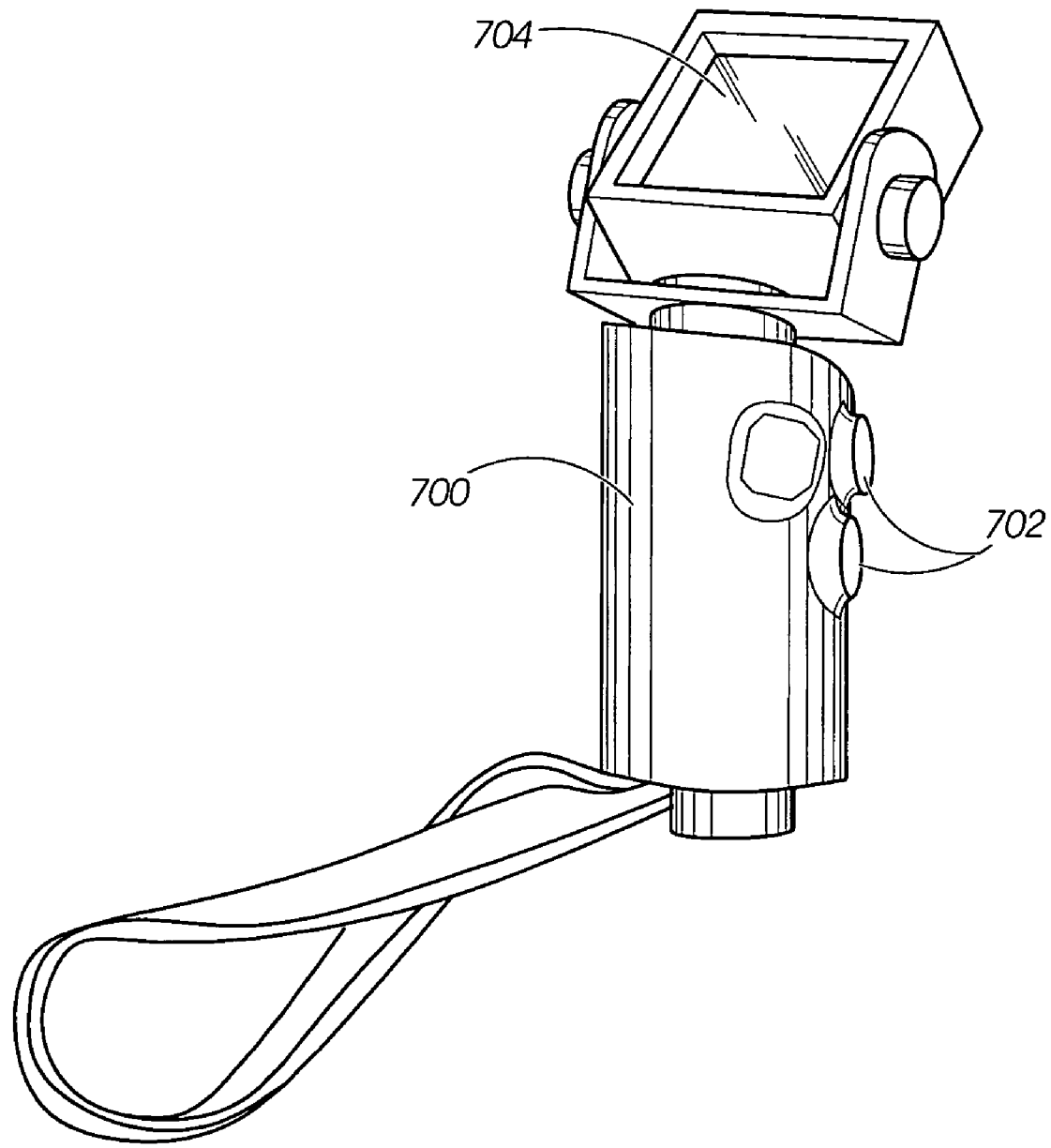
FIG. 7 depicts another embodiment of the station of FIG. 2 which is useful for understanding the present invention.

Referring to FIG. 7, an embodiment is depicted in which the station is implemented as a mobile gaming device 700 which is constructed to withstand rugged game play. The gaming device 700 can include user input controls 702, for instance buttons and/or touch pads, for receiving user inputs, and an adjustable display 704 can be provided to present the GUI. Importantly, the embodiments shown in FIGS. 6 and 7 are examples of gaming devices in which the systems and methods described herein can be implemented, but the invention is not limited to such embodiments.

The present invention can be realized in hardware, software, or a combination of hardware and software. The present invention can be realized in a centralized fashion in one system, or in a distributed fashion where different elements are spread across several interconnected systems. Any kind of processing device or other apparatus adapted for carrying out the methods described herein is suited. A typical combination of hardware and software can be a processing device with an application that, when being loaded and executed, controls the processing device such that it carries out the methods described herein.

The present invention also can be embedded in an application program product, which comprises all the features enabling the implementation of the methods described herein, and which when loaded in a processing device is able to carry out these methods. Application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A fist mobile station comprising:
a wireless transceiver which communicatively links the first mobile station to at least a second mobile station;
a targeting display which presents to a first player using the first mobile station an icon representing at least a second player using the second mobile station and at least one targeting icon, the targeting icon being useable by the first player to target the second player based on a physical location of the second mobile station with respect to a physical location of the first mobile station;
wherein the first mobile station and the second mobile station are each communicatively linked to a positioning system which determines the physical location of the second mobile station with respect to the physical location of the first mobile station, wherein the first mobile station comprises an ultrasound transducer that generates at least one narrowly focused ultrasound beam in response to a simulated weapon activation on the first mobile station.

2. The mobile station of claim 1, wherein the first mobile station or the second mobile station comprises a sensory output device which is responsive to a simulated weapon activation on the first mobile station.

3. The mobile station of claim 2, wherein the sensory output device generates physical stimuli when the simulated weapon activation occurs while the targeting icon is at least partially aligned with the icon representing the second player.

4. The mobile station of claim 3, wherein an intensity of the physical stimuli correlates to a degree of alignment of the targeting icon and the icon representing the second player.

5. A first mobile station comprising:
a wireless transceiver which communicatively links the first mobile station to at least a second mobile station;
a targeting display which presents to a first player using the first mobile station an icon representing at least a second player using the second mobile station and at least one targeting icon, the targeting icon being useable by the first player to target the second player based on a physical location of the second mobile station with respect to a physical location of the first mobile station;

wherein the first mobile station and the second mobile station are each communicatively linked to a positioning system which determines the physical location of the second mobile station with respect to the physical location of the first mobile station;

wherein the targeting display presents the icon representing the second player from a perspective of an eye level view with a size that varies in proportion to the distance between the first mobile station and the second mobile station.

6. The mobile station of claim 5, whererin the first mobile station and the second mobile station are communicatively linked via a wireless local area network (WLAN), a cellular communicaions network or a direct wireless communications network.

7. The mobile station of claim 5, wherein the first mobile station or the second mobile station comprises a sensory output device which is responsive to a simulated weapon activation on the first mobile station.

8. The mobile station of claim 7, wherein the audible sound communicates a user selectable message.

9. The mobile station of claim 6, wherein at least one acoustic parameter of the ultrasound beam is a frequency or an intensity, and the acoustic parameter is selectively controlled based on the determined physical location of the second mobile station with respect to an aiming of the first mobile station or a location of the first mobile station.

10. The mobile station of claim 1, wherein the first mobile station and the second mobile station are communicatively linked via a wireless local area network (WLAN), a cellular communications network or a direct wireless communications network.

11. A machine readable storage, having stored thereon a computer program having a plurality of code sections executable by a machine for causing the machine to perform the steps of:

wirelessly linking a first mobile station and at least a second mobile station;

determining a physical location of the at least a second mobile station with respect to a physical location of the first mobile station;

presenting to a first player using the first mobile station an icon representing at least a second player using the at least a second mobile station;

presenting at least one targeting icon, the at least one targeting icon being useable by the first player to target the at least a second player based on the determined physical location; and causing the machine to generate at least one narrowly focused ultrasound beam from the first mobile station in response to a simulated weapon activation on the first mobile station.

12. A gaming system comprising at least a first mobile station, the first mobile station comprising:

a wireless adapter which communicatively links the first mobile station to at least a second mobile station;

a targeting display which presents to a first player using the first mobile station an icon representing at least a second player using the second mobile station, and at least one targeting icon, the at least one targeting icon being useable by the first player to target the second player based on a physical location of the second station with respect to a physical location of the first station;

wherein the first mobile station and the second mobile station are each communicatively linked to a positioning system which determines the physical location of the second mobile station with respect to the physical location of the first mobile station.

* * * * *